No. 764,419. PATENTED JULY 5, 1904.
J. F. A. BRUUN.
SEPARATOR.
APPLICATION FILED AUG. 18, 1902. RENEWED MAY 26, 1904.
NO MODEL.

No. 764,419. Patented July 5, 1904.

UNITED STATES PATENT OFFICE.

JOHAN FREDERIK ADOLPH BRUUN, OF COPENHAGEN, DENMARK.

SEPARATOR.

SPECIFICATION forming part of Letters Patent No. 764,419, dated July 5, 1904.

Application filed August 18, 1902. Renewed May 26, 1904. Serial No. 209,939. (No model.)

*To all whom it may concern:*

Be it known that I, JOHAN FREDERIK ADOLPH BRUUN, a subject of the King of Denmark, residing at 131 Vesterbrogade, Copenhagen, Denmark, have invented a new and useful Separator for Separating Air, Water, and Oil Particles from Exhaust-Steam, of which the following is a specification.

The present invention refers to a separator for separating air, water, and oil particles from the exhaust-steam and decreasing the pressure in the exhaust-pipe by means of the separator with automatic ejector shown on the accompanying drawings.

Figure 1:
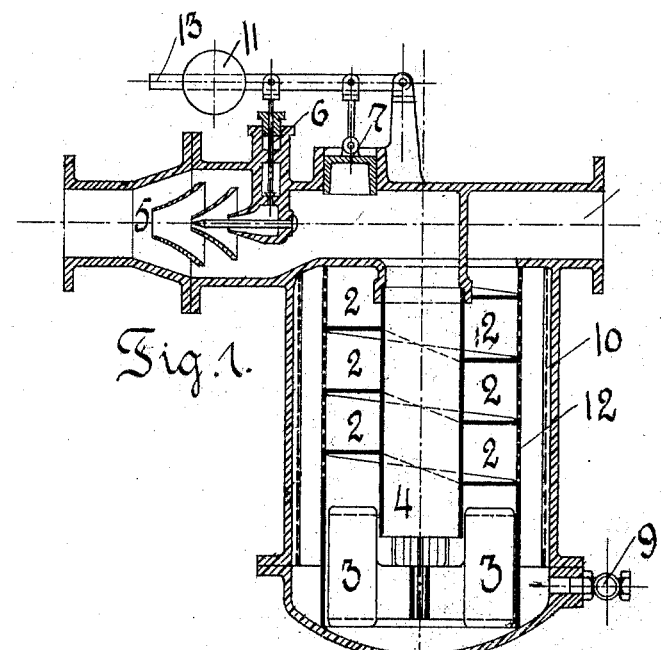
Figure 2:
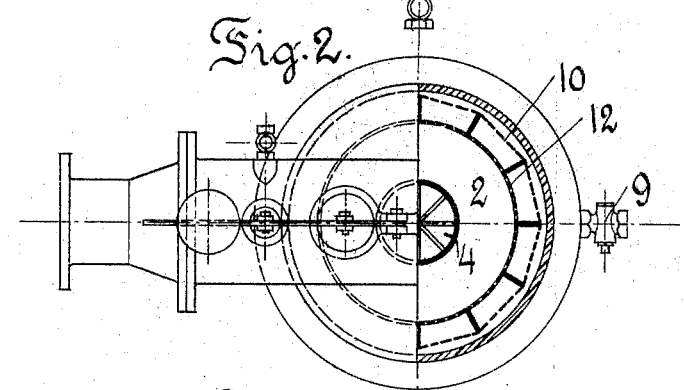
Figure 3:
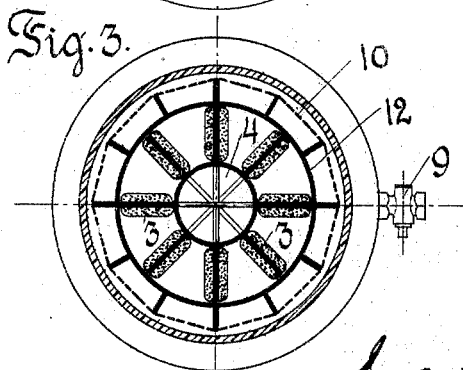

Figure 1 shows the separator in vertical section. Fig. 2 represents the separator in horizontal elevation and section; and Fig. 3 is a horizontal section on line A B, Fig. 1.

The separator is mounted upon the exhaust-pipe close to the engine. The steam enters through the aperture 1 of a closed container, passes through a spiral channel 2, arranged either concentrically or eccentrically inside the said container and which on the external side is bounded by a cylinder 12, formed of perforated plates, passes then in contact with filtering material 15, applied to opposite sides of plates 3, into the lower end of pipe 4. From the upper end of the latter it passes into the exhaust-conduit 16. As the exhaust-steam passes through the spiral channel 2 oil, water, and air will, owing to the centrifugal force and their greater specific gravity, be slung through the perforated cylinder out against a cloth mantle 10, fixed upon vertical ribs. The oil will partly be absorbed by this cloth, partly sink down, together with the water and the air, to the bottom of the separator, where the oil and the water will be blown out through the cock 8 and the air through the cock 9.

Through starting the engine or by a sudden development of power of the engine a considerable back pressure will arise in the exhaust-pipe until the air has been forced out, and it is to avoid this that the ejector 5 has been provided. The piston 7 will at a certain back pressure be raised and at the same time open the stop-valve 6, whereby the steam will pour out through the ejector and suck air and exhaust-steam out of the separator and the pipes until the back pressure has gone down to its fixed limit. The piston 7 will then go down and close the valve 6. The valve 6 can, by means of the weight 11 upon the valve-lever 13, be adjusted to open at a certain pressure.

The ejector can be mounted either at the discharge-opening or at the inlet-opening of the separator.

Having now particularly described my said invention and in what manner the same is to be performed, I declare that what I claim is—

1. In a separator of the kind described, an outlet pipe or passage, a spiral channel around said outlet pipe or passage having a perforated outer wall and communicating at one end with said outlet pipe or passage and at its other end with a passage for delivering steam thereto, and an absorbing-mantle around the outer perforated wall of the spiral channel.

2. In a separator of the kind described, an outlet pipe or passage, a spiral channel around said outlet pipe or passage having a perforated outer wall and communicating at one end with said outlet pipe or passage and at its other end with a passage for delivering steam thereto and filter-plates with which the steam makes contact in passing from the spiral channel into the outlet-pipe.

3. In a separator of the kind described, an outlet pipe or passage, a spiral channel around said outlet pipe or passage having a perforated outer wall and communicating at one end with said outlet pipe or passage and at its other end with a passage for delivering steam thereto, and a steam-ejector automatically operated by back pressure located in one of the pipes or passages with which the spiral channel communicates.

In testimony that I claim the foregoing as my invention I have signed my name in presence of two subscribing witnesses.

JOHAN FREDERIK ADOLPH BRUUN.

Witnesses:
SIGURD CHRISTENSEN,
CARL TUUL MAGLEKILDE.